United States Patent
Carrasco

(10) Patent No.: US 9,841,294 B2
(45) Date of Patent: Dec. 12, 2017

(54) ROTOR SENSOR TARGET FOR MAGNETIC BEARINGS

(71) Applicant: Eduardo Carrasco, Saint Etienne sous Bailleul (FR)

(72) Inventor: Eduardo Carrasco, Saint Etienne sous Bailleul (FR)

(73) Assignee: SKF MAGNETIC MECHATRONICS, Rue des Champs, Saint-Marcel (FR)

( * ) Notice: Subject to any disclaimer, the term of this patent is extended or adjusted under 35 U.S.C. 154(b) by 0 days.

(21) Appl. No.: 14/572,849

(22) Filed: Dec. 17, 2014

(65) Prior Publication Data

US 2015/0177024 A1 Jun. 25, 2015

(30) Foreign Application Priority Data

Dec. 20, 2013 (EP) ..................... 13306817

(51) Int. Cl.
*G01B 7/30* (2006.01)
*G01D 5/14* (2006.01)
(Continued)

(52) U.S. Cl.
CPC ................. *G01D 5/14* (2013.01); *G01D 5/20* (2013.01); *F16C 32/0446* (2013.01)

(58) Field of Classification Search
CPC .. G01D 5/12; G01D 5/14; G01D 5/20; G01D 5/2013; F16C 32/0446; F16C 32/0442; H02K 1/27; H02K 1/2706; H02K 1/2708; H02K 1/2713; H02K 1/272; H02K 1/2726; H02K 1/2733; H02K 1/2786; H02K 1/2793; H02K 1/274; H02K 1/28; H02K 1/30;
(Continued)

(56) References Cited

U.S. PATENT DOCUMENTS 3,320,453 A * 5/1967 Kober ................. H02K 1/2793
                                                310/154.05
4,652,780 A * 3/1987 Murakami .......... F16C 32/0465
                                                310/90.5
(Continued)

FOREIGN PATENT DOCUMENTS

EP        1223357 A1    7/2002
JP     2005076792 A     3/2005
WO       9832981 A1    7/1998

*Primary Examiner* — Arleen M Vazquez
*Assistant Examiner* — Steven Yeninas
(74) *Attorney, Agent, or Firm* — Bryan Peckjian; SKF USA Inc. Patent Dept.

(57) ABSTRACT

A rotor sensor target for magnetic bearings, the rotor sensor target comprising a ring-shaped assembly of magnetic material mounted on a generally ring-shaped assembly of non-magnetic material. The magnetic and non-magnetic ring shaped assemblies are coaxially arranged and mounted on a shaft having a longitudinal axis of rotation X'-X. The generally ring-shaped assembly of non-magnetic material comprises at least one ring-shaped slit having the longitudinal axis X'-X and may be made of a cheaper material, such as aluminum. The ring-shaped slit provides flexibility which permits operation over a wide range of temperatures without risking of damaging the ring-shaped assembly of magnetic material.

18 Claims, 5 Drawing Sheets

(51) Int. Cl.
*G01D 5/20* (2006.01)
*F16C 32/04* (2006.01)

(58) Field of Classification Search
CPC .......... H02K 7/086; H02K 7/09; H02K 15/02; H02K 15/024; H02K 15/03; H02K 15/0018; H02K 15/028
USPC ............ 324/207.15, 207.16, 207.17, 207.22, 324/207.25; 310/68 B, 90.5, 156.01, 310/156.05, 156.06, 156.07, 156.08, 310/156.09, 156.11, 156.12, 156.13, 310/156.14, 156.15, 21, 216
See application file for complete search history.

(56) References Cited

U.S. PATENT DOCUMENTS

| | | | | |
|---|---|---|---|---|
| 5,500,994 | A * | 3/1996 | Itaya | H02K 1/2733 264/272.2 |
| 6,563,245 | B1 * | 5/2003 | Suzuki | B60T 8/4022 310/233 |
| 6,849,979 | B2 | 2/2005 | Brunet et al. | |
| 7,466,051 | B2 * | 12/2008 | Miya | F16C 32/0438 310/156.08 |
| 2007/0080597 | A1 * | 4/2007 | Suzuki | H02K 1/2733 310/156.47 |
| 2011/0049109 | A1 * | 3/2011 | Weeber | C22C 19/055 219/75 |
| 2011/0316376 | A1 | 12/2011 | Sortore et al. | |
| 2013/0313935 | A1 * | 11/2013 | Himeno | H02K 1/2793 310/156.32 |
| 2014/0117789 | A1 * | 5/2014 | Uematsu | H02K 1/02 310/43 |

* cited by examiner

ROTOR SENSOR TARGET FOR MAGNETIC BEARINGS

CROSS REFERENCE TO RELATED APPLICATION

This is a U.S. Non-Provisional Patent Application claiming the benefit of European Patent Application Number EP13306817 filed on 20 Dec. 2013 (Dec. 20, 2013), which is incorporated herein by reference in its entirety.

TECHNICAL FIELD OF THE INVENTION

The present invention relates to a rotor sensor target for magnetic bearings.

BACKGROUND OF THE INVENTION

An active magnetic bearing which may be a radial bearing or an axial (or thrust) bearing comprises a rotor, a stator fitted with electromagnet windings, at least one sensor for sensing the radial or axial position of the rotor and servo-control circuits for maintaining the rotor in equilibrium without contact with the stator, the currents carried by the electromagnets of the stator being servo-controlled on the basis of signals delivered by the at least one sensor.

FIG. 9 schematically shows an example of a known radial magnetic bearing 200 comprising a stator with a stack of ferromagnetic laminations 211 and electromagnet windings 212 and a rotor fitted with a second stack of laminations 213 mounted on a shaft 220. A radial position detector 201 of the inductive type comprises a stator with a stack of ferromagnetic laminations 231 and electromagnet windings 232 and a rotor fitted with a second stack of laminations 233 mounted on the shaft 220. An axial position detector 202 of the inductive type comprises a stator with stacks of ferromagnetic laminations 251, 251' and electromagnet windings 252, 252' and a rotor fitted with second stacks of laminations 253, 253' mounted on the shaft 220. The servo-control circuits are not illustrated in FIG. 9. Active magnetic bearings may be configured in various manners. In particular, as disclosed in U.S. Pat. No. 6,849,979 B2, radial and/or axial position sensors may be combined and/or integrated in a bearing. Moreover the ferromagnetic laminations may also be replaced by solid parts of a magnetic material.

When the position sensors are of the inductive type, the rings of rotor laminations such as the stacks of ferromagnetic laminations 233, 253 and 253' in FIG. 9 and their support are called a rotor sensor target.

FIG. 10 illustrates an example of a known rotor sensor target. Target materials 230, 240 are mounted on a shaft 220 which is typically made of carbon steel and are made integral thereto.

Generally speaking to make an axial or an axial-radial sensor on the rotor of a magnetic bearing system, two materials are needed, i.e. a first non-magnetic material and a second magnetic material, which may be made of laminations or of a solid part. The axial displacement of the rotor is measured at the border between the magnetic and the non-magnetic materials. These materials need to have sufficient strength to withstand high speeds and different temperatures without losing contact to the main shaft or breaking.

In the known embodiment illustrated in FIG. 10, Inconel 718 may be used as a non-magnetic material constituting a main target component 240 in combination with laminations 230 of magnetic material. The main target component made of non-magnetic material may comprise a ring 241 having a height H1 which is mounted on the shaft 220 of carbon steel having a height H2.The laminations 230 of ferromagnetic material are mounted on the ring 241 and are maintained between an additional ring 242 of non-magnetic material and a projection 243 of the ring 241.

The advantage given by the Inconel as a non-magnetic material is its very high mechanical resistance together with a coefficient of thermal expansion very close to the steel coefficient of thermal expansion. The addition of these two properties allows the sensor to be used in a wide range of temperatures and speeds. However there is a disadvantage of a very high cost due to the Inconel price.

As an alternative material to Inconel a design with a high resistance stainless steel (Z6NiCrTiMoVB25-15-2) or High resistance brass (CuNi2Si) has been used for the non-magnetic material 241, 242 to reduce the cost compared to Inconel with little restrictions on temperature and speed but a lower cost. The laminations of magnetic material 230 are usually made of FeSi.

As shown in FIG. 10, with the conventional shape of the ring 241 with a projection 243 and of the additional ring 242 all made of non-magnetic material such as Inconel, high resistance stainless steel or high resistance brass, the height H1 of the material under the magnetic iron laminations 230 interposed between the ring 242 and the projection 243 and the addition of the height H2 (i.e. the radius) of the shaft 220 under the magnetic portion 230 of the sensor target gives a very stiff assembly which may be detrimental to the magnetic portion made of laminations if some cheaper non-magnetic materials are used for the ring 241 with projection 243 and the ring 242.

SUMMARY OF THE INVENTION

The technical problem to be solved is to provide a cheaper rotor sensor target for magnetic bearings which remedies the above-mentioned problems or drawbacks and in particular exhibits good operational conditions and reduces the risks of damaging the magnetic portion of a rotor axial or axial-radial sensor target, even if the sensor target is subjected to a wide range of temperatures during operation.

In particular, the invention aims at improving the easiness of a manufacturing process, enabling a lower cost and a high serial manufacturing process.

The invention more specifically relates to a rotor sensor target for magnetic bearings, comprising a ring-shaped assembly of magnetic material mounted on a generally ring-shaped assembly of non-magnetic material, which are coaxially arranged and mounted on a shaft having a longitudinal axis of rotation X'-X, characterized in that the generally ring-shaped assembly of non-magnetic material comprises at least one ring-shaped slit having the longitudinal axis X'-X.

Preferably, the generally ring-shaped assembly of non-magnetic material is made of a relatively cheap material such as aluminum.

According to a first embodiment, the generally ring-shaped assembly of non-magnetic material comprises a set of first and second independent rings within which is interposed the ring-shaped assembly of magnetic material.

According to a second embodiment, the generally ring-shaped assembly of non-magnetic material comprises a first independent ring located on one side of the ring-shaped assembly of magnetic material and a second ring located on the other side of the ring-shaped assembly of magnetic material along the longitudinal axis X-X', the second ring being a projection of a bigger ring extending internally beneath the first independent ring and the ring-shaped assembly of magnetic material along the longitudinal axis X-X'.

The ring-shaped slit provides flexibility which permits operation over a wide range of temperatures without risking of damaging the ring-shaped assembly of magnetic material.

Due to a specific shape of the sensor parts including at least one ring-shaped slit, it is possible to use less resistant non-magnetic materials such as aluminum, instead of e.g. Inconel or hi-grade brass for building a rotor sensor target for magnetic bearings.

The improved shape of the sensor target permits the use of a material such as aluminum which has sufficient strength to withstand high speeds and different temperatures without losing contact with the main shaft and without breaking.

The present invention allows using the flexibility of the components of the target to be able to keep all parts in place without over stressing the components, which may thus be made of less resistant material such as aluminum which reduces the cost of the sensor.

At high temperatures, notwithstanding the fact that the coefficient of thermal expansion of the aluminum is higher than the coefficient of thermal expansion of iron laminations, due to the specific configuration of the sensor target according to the invention, at high temperatures the iron laminations will not be stressed over the yield tensile strength and therefore the target will remain suitable for operation at lower temperatures, contrary to the conventional structures proposed in the prior art.

Due to the provision of at least one ring-shaped slit, a ring under the iron laminations or similar magnetic material may be made very thin and only supported at one or both edges of the thinner ring making it more flexible and compensating the effort given by the higher thermal expansion of a non-magnetic material such as aluminum. In this way the stress on magnetic laminations will always be under the yield tensile strength. It is therefore possible to work at higher temperatures even with a combination of cheaper materials for the non-magnetic and magnetic materials such as aluminum and iron laminations.

The invention may be implemented with various shapes and configurations for the assembly of non-magnetic material.

According to a variant embodiment the at least one ring-shaped slit having the longitudinal axis X'-X is located between a thicker ring-shaped body of non-magnetic material mounted on the shaft and a thinner ring-shaped body of non-magnetic material mounted beneath the ring-shaped assembly of magnetic material.

In such a case according to an advantageous embodiment the at least one ring-shaped slit having the longitudinal axis X'-X is closed at both ends by narrow projections of the thicker ring-shaped body of non-magnetic material mounted on the shaft.

According to another variant embodiment the at least one ring-shaped slit having the longitudinal axis X'-X is provided within a thicker ring-shaped body of non-magnetic material mounted on the shaft and located beneath the ring-shaped assembly of magnetic material, the thicker ring-shaped body of non-magnetic material having a substantially U-shape in longitudinal half cross-section along the longitudinal axis X-X'.

According to still another variant embodiment the at least one ring-shaped slit having the longitudinal axis X'-X is provided within a ring-shaped body of non-magnetic material mounted on the shaft and located beneath the ring-shaped assembly of magnetic material, the ring-shaped body of non-magnetic material comprising a thicker ring-shaped portion mounted on the shaft, a thinner ring-shaped portion located beneath the ring-shaped assembly of magnetic material and a narrow portion bridging the thinner ring-shaped portion and the thicker ring-shaped portion on one side of the at least one ring-shaped slit, the ring-shaped body of non-magnetic material having a substantially C-shape in longitudinal half cross-section along the longitudinal axis X-X'.

According to still another variant embodiment the sensor target comprises first and second ring-shaped slits having the longitudinal axis X'-X which are provided within a ring-shaped body of non-magnetic material mounted on the shaft and located beneath the ring-shaped assembly of magnetic material, the ring-shaped body of non-magnetic material comprising a first thin ring-shaped portion mounted on the shaft, a second thin ring-shaped portion located between the first and second ring-shaped slits, a third thin ring-shaped portion located beneath the ring-shaped assembly of magnetic material, a first narrow portion bridging the first and second thin ring-shaped portions on one side of the first ring-shaped slit, a second narrow portion bridging the second and third thin ring-shaped portions on another side of the second ring-shaped slit, the ring-shaped body of non-magnetic material having a substantially S-shape in longitudinal half cross-section along the longitudinal axis X-X'.

The shaft may be made of carbon steel, whereas the magnetic material may be iron laminations preferably silicon iron laminations.

The invention further relates to an axial-radial sensor for active magnetic bearings, comprising a rotor sensor target as defined above.

Other characteristics and advantages of the invention appear from the following description of particular embodiments, given as examples and with reference to the accompanying drawings.

DETAILED DESCRIPTION OF SOME EMBODIMENTS

The present invention will be described in connection with preferred embodiments which are given by way of examples.

The features of the different embodiments may be combined together unless otherwise stated.

Figure 1:
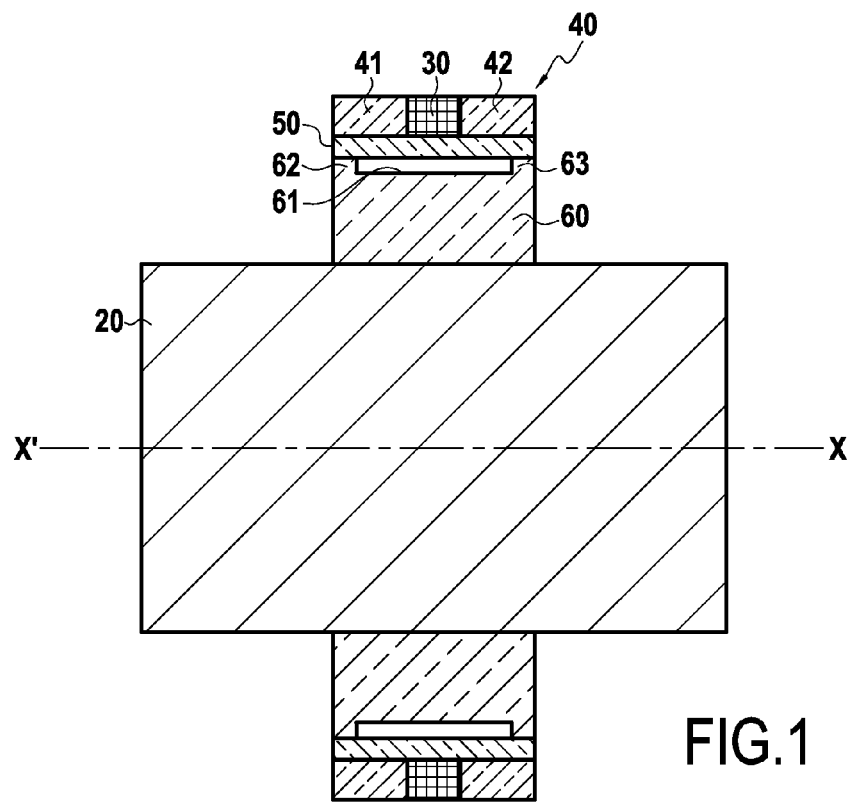
FIG. 1 is a longitudinal sectional view of components of a rotor sensor target according to a first embodiment of the invention.

A typical arrangement of a first embodiment of the invention is illustrated in FIG. 1.

As shown in FIG. 1, in order to constitute a rotor sensor target on a shaft 20 having a longitudinal axis X-X' and being made for example of carbon steel, a ring-shaped assembly 30 of magnetic material, such as laminations of silicon iron, is coaxially arranged with the shaft 20 and is mounted on a generally ring-shaped assembly of non-magnetic material, such as aluminum, which is also coaxially arranged with the shaft 20 and is mounted thereon and bonded thereto by any known means.

In the embodiment of FIG. 1, the assembly of non-magnetic material comprises a first relatively thick ring-shaped body 60 which is directly bonded to the shaft 20 and has two narrow slightly projecting parts or flanges 62, 63 on the outer surface of this first relatively thick ring-shaped body 60.

The assembly of non-magnetic material further comprises a second relatively thin ring-shaped part 50 which is fitted on the two narrow slightly projecting parts 62, 63 of the first relatively thick ring-shaped body 60, thus defining a ring-shaped slit 61 between the first relatively thick ring-shaped body 60 and the second relatively thin ring-shaped part 50. The second relatively thin ring-shaped part 50 is preferably made of the same material as the first relatively thick ring-shaped body 60, such as aluminum, but it is also possible to choose different materials. Finally, the ring-shaped assembly 30 of magnetic material is interposed between first and second rings 41, 42 which are made of non-magnetic material, such as aluminum and define a set 40 of rings bonded to the outer surface of the second relatively thin ring-shaped part 50.

The provision of a thin ring-shaped part 50 immediately under the ring-shaped assembly of magnetic material 30 and the fact that such thin ring-shaped part 50 is only supported at the two narrow slightly projecting parts 62, 63 constituting the edges of the first relatively thick ring-shaped body 60, whereas a ring-shaped slit 61 is defined between these edges 62, 63, provides flexibility to the thin ring-shaped part 50 and to the whole sensor target. This avoids that the ring-shaped assembly of magnetic material 30 be subjected to undue stresses when the sensor is used in a wide range of temperatures.

Figure 9:
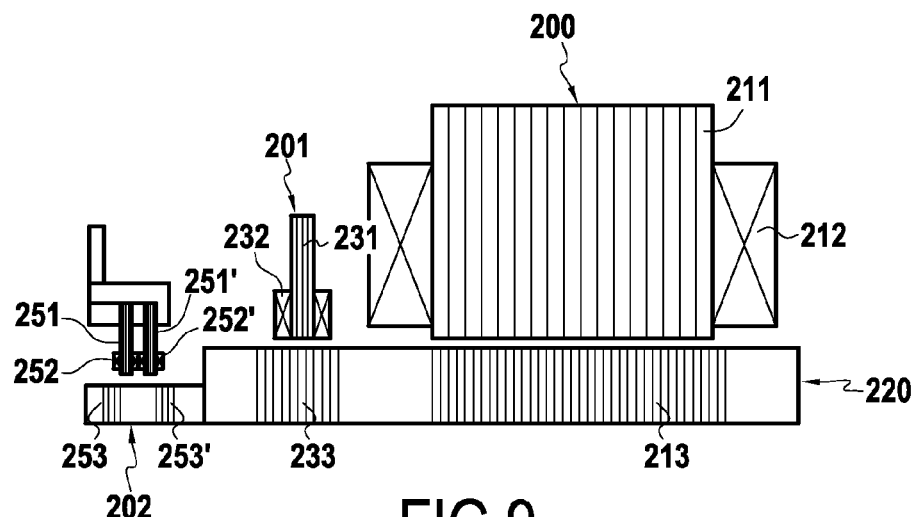
FIG. 9 is an axial half-section view of an example of a prior art active magnetic bearing.
Figure 10:
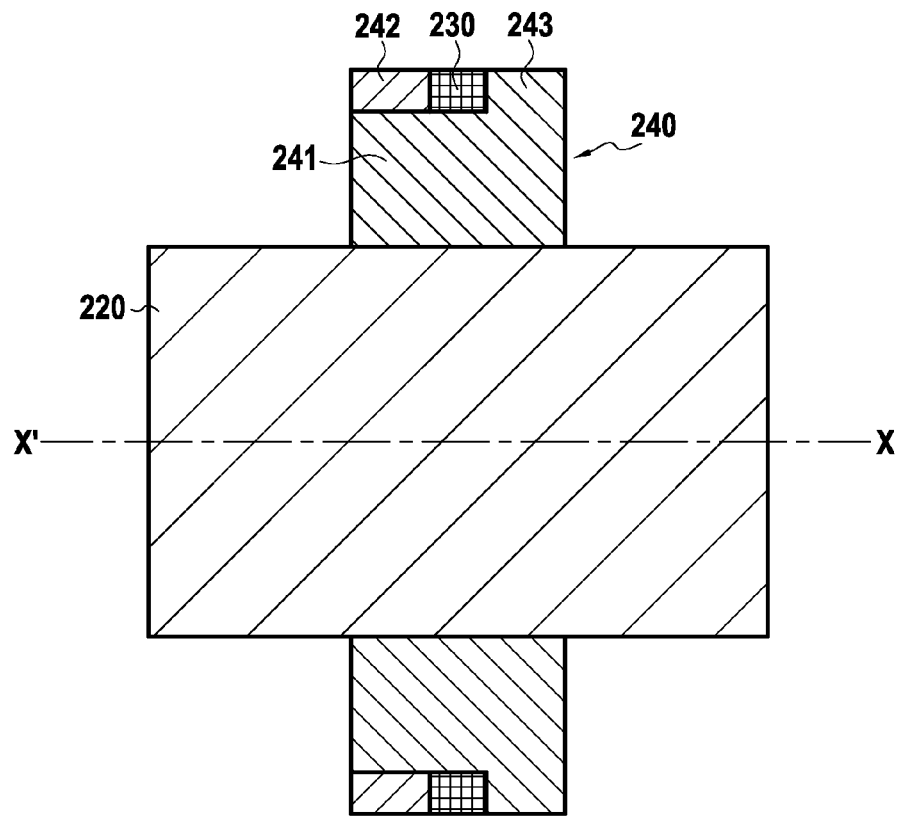
FIG. 10 is a longitudinal sectional view of components of a rotor sensor target according to an embodiment of the prior art.

The rotor sensor target according to the invention may be used in an axial or axial-radial sensor comprising a conventional stator having a stack of ferromagnetic laminations and electromagnet windings as shown e.g. in FIG. 9.

Figure 2:
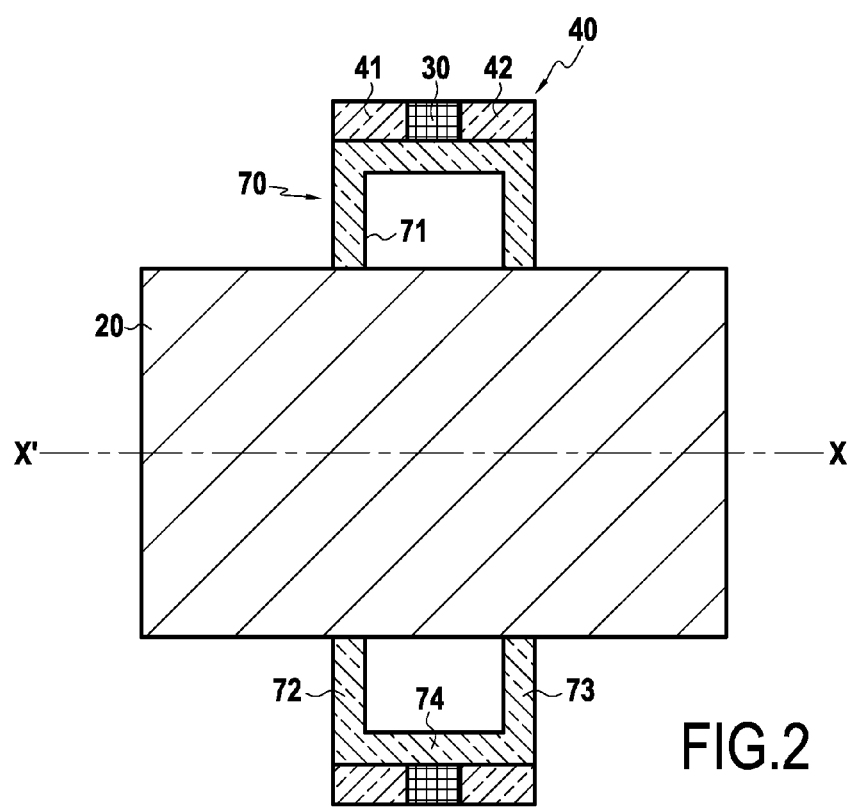
FIG. 2 is a longitudinal sectional view of components of a rotor sensor target according to a second embodiment of the invention.

FIG. 2 illustrates a second embodiment which is generally similar to the embodiment of FIG. 1 in as much as it comprises a ring-shaped assembly of magnetic material 30 interposed between first and second rings 41, 42 which are made of non-magnetic material, such as aluminum and define a set 40 of rings bonded to an outer surface of another ring-shaped part 70 made of non-magnetic material. In the embodiment of FIG. 2 the elements which are identical to the elements of the embodiment of FIG. 1 bear the same reference numerals and will not be described again in detail.

In the second embodiment of FIG. 2, one ring-shaped slit 71 is provided within a thicker ring-shaped body 70 of non-magnetic material mounted on the shaft 20 and directly located beneath the ring-shaped assembly of magnetic material 30. The thicker ring-shaped body 70 of non-magnetic material has a substantially U-shape in longitudinal half cross-section along the longitudinal axis X-X' and comprises first and second radial flanges 72, 73 as well as a cylindrical portion 74 which is located directly beneath the ring-shaped assembly of magnetic material 30. The cylindrical portion 74 may be relatively thin and can be compared with the ring 50 of the embodiment of FIG. 1, whereas the flanges 72, 73 may be compared to the edges 62, 63 of the thicker ring-shaped body 60 of the embodiment of FIG. 1.

Figure 3:
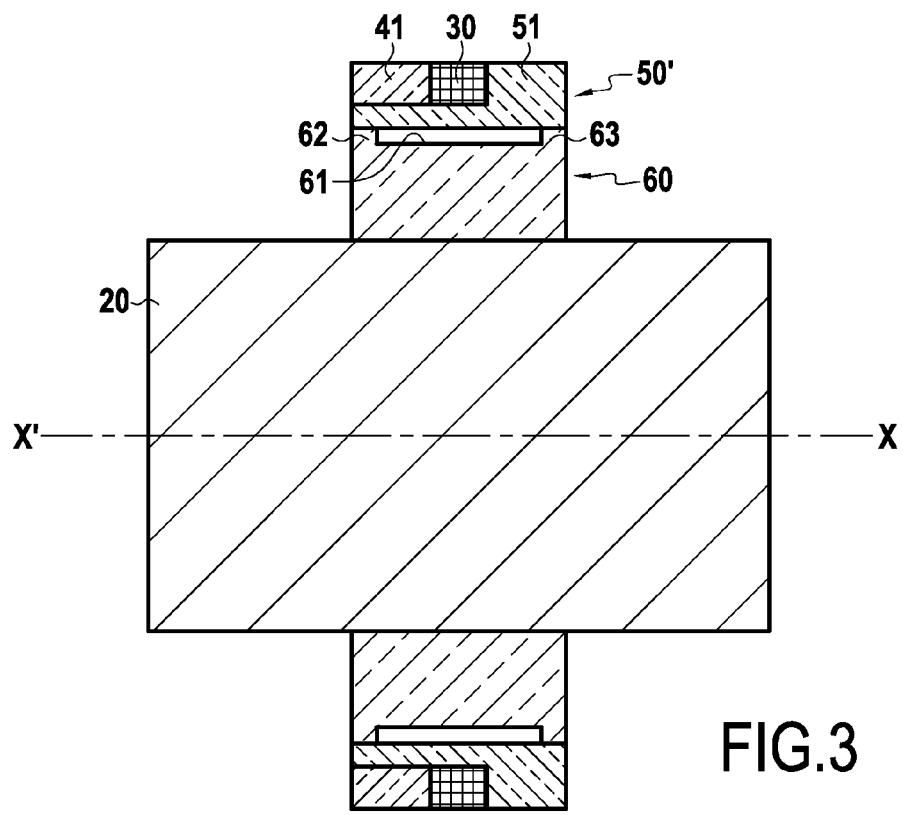
FIG. 3 is a longitudinal sectional view of components of a rotor sensor target according to a variant of the first embodiment of the invention.

FIG. 3 illustrates a variant embodiment of the sensor target of FIG. 1. The configuration is very similar, but in the embodiment of FIG. 3, the second ring 42 of the embodiment of FIG. 1 is replaced by a projection 51 of the relatively thin ring 50' which was already present in the embodiment of FIG. 1.

Figure 4:
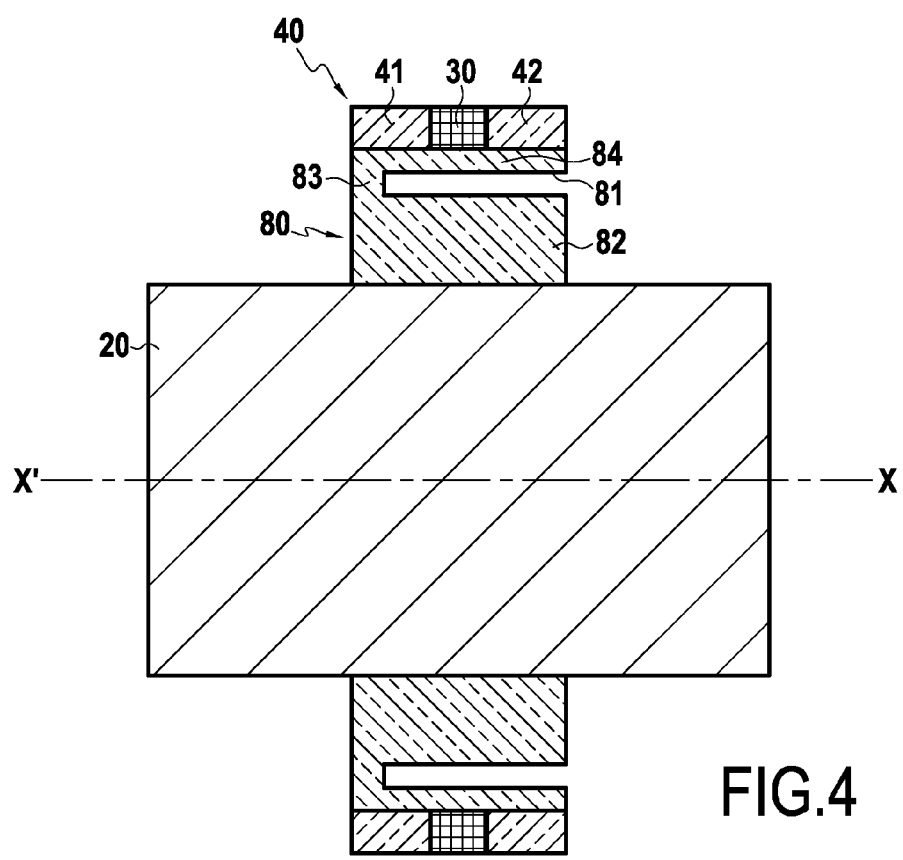
FIG. 4 is a longitudinal sectional view of components of a rotor sensor target according to a third embodiment of the invention.

FIG. 4 illustrates a third embodiment which is generally similar to the embodiment of FIG. 1 in as much as it comprises a ring-shaped assembly of magnetic material 30 interposed between first and second rings 41, 42 which are made of non-magnetic material, such as aluminum and define a set 40 of rings bonded to an outer surface of another ring-shaped part 80 made of non-magnetic material. In the embodiment of FIG. 4 the elements which are identical to the elements of the embodiment of FIG. 1 bear the same reference numerals and will not be described again in detail.

In the third embodiment of FIG. 4, one ring-shaped slit 81 is provided within a thicker ring-shaped body 80 of non-magnetic material mounted on the shaft 20 and directly located beneath the ring-shaped assembly of magnetic material 30.

The ring-shaped slit 81 having a longitudinal axis X'-X is provided within a ring-shaped body 80 of non-magnetic material mounted on the shaft 20 and located beneath the ring-shaped assembly of magnetic material 30. The ring-shaped body 80 of non-magnetic material comprises a thicker ring-shaped portion 82 mounted on the shaft 20, a thinner ring-shaped portion 84 located beneath the ring-shaped assembly of magnetic material 30 and a narrow portion 83 bridging the thinner ring-shaped portion 84 and the thicker ring-shaped portion 82 on one side of the ring-shaped slit 81. The ring-shaped body 80 of non-magnetic material thus has a substantially C-shape in longitudinal half cross-section along the longitudinal axis X-X'. The thinner ring-shaped portion 84 and the ring-shaped slit 81 of the third embodiment of FIG. 4 may be compared to the thin ring 50 and the annular slit 61 of the first embodiment of FIG. 1 respectively.

Figure 5:
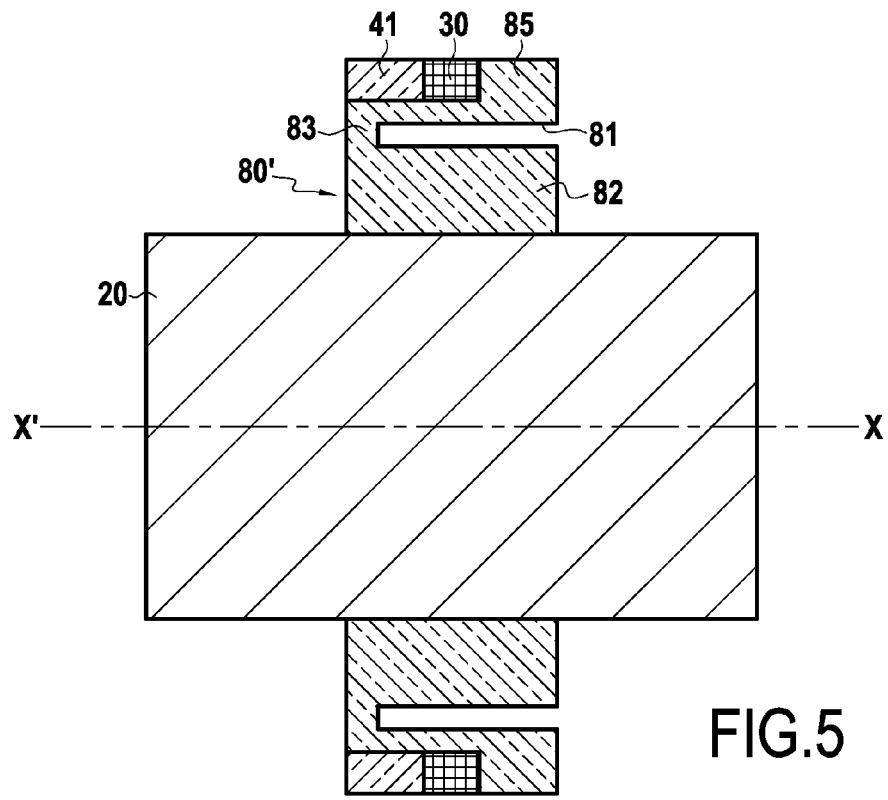
FIG. 5 is a longitudinal sectional view of components of a rotor sensor target according to a variant of the third embodiment of the invention.

FIG. 5 illustrates a variant embodiment of the sensor target of FIG. 4. The configuration is very similar, but in the embodiment of FIG. 5, the second ring 42 of the embodiment of FIG. 4 is replaced by a projection 85 of a thinner ring-shaped portion 84 of a ring-shaped body 80' which was already present in the embodiment of FIG. 4.

Figure 6:
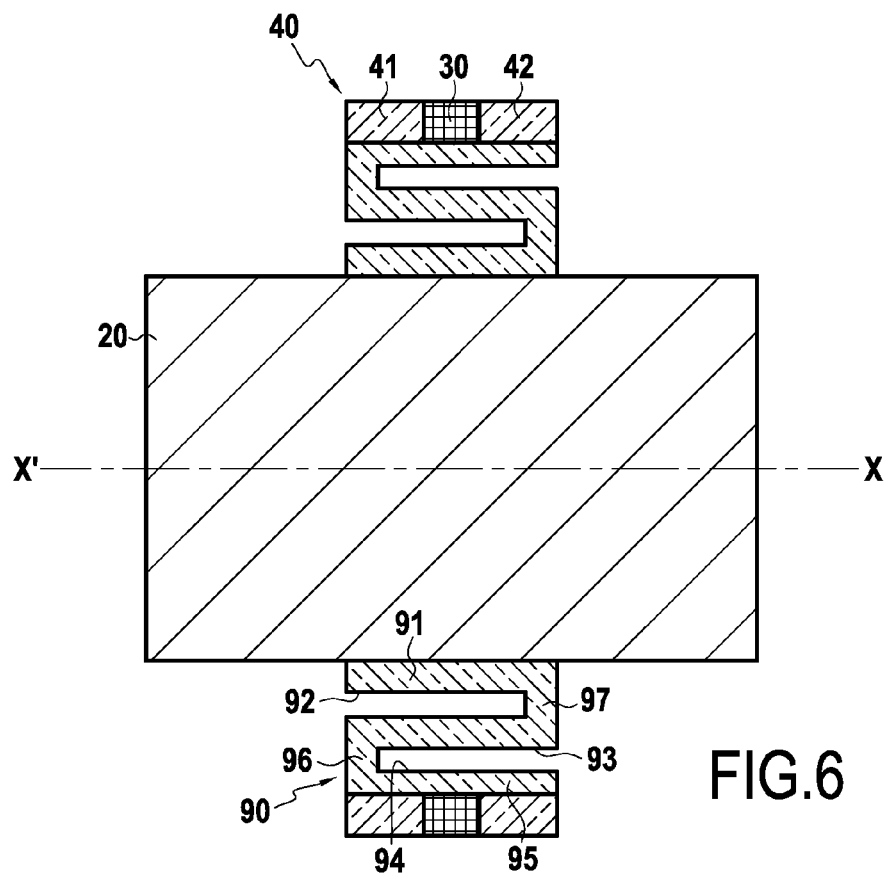
FIG. 6 is a longitudinal sectional view of components of a rotor sensor target according to a fourth embodiment of the invention.

FIG. 6 illustrates a fourth embodiment which is generally similar to the embodiment of FIG. 1 in as much as it comprises a ring-shaped assembly of magnetic material 30 interposed between first and second rings 41, 42 which are made of non-magnetic material, such as aluminum and define a set 40 of rings bonded to an outer surface of another ring-shaped part 90 made of non-magnetic material. In the embodiment of FIG. 6 the elements which are identical to the elements of the embodiment of FIG. 1 bear the same reference numerals and will not be described again in detail.

In the third embodiment of FIG. 6, the sensor target comprises first and second ring-shaped slits 92, 94 having a longitudinal axis X'-X which are provided within a ring-shaped body 90 of non-magnetic material mounted on the shaft 20 and located beneath the ring-shaped assembly of magnetic material 30. The ring-shaped body 90 of non-magnetic material comprises a first thin ring-shaped portion 91 mounted on the shaft 20, a second thin ring-shaped portion 93 located between the first and second ring-shaped slits 92, 94, a third thin ring-shaped portion 95 located beneath the ring-shaped assembly of magnetic material 30, a first narrow portion 97 bridging the first and second thin ring-shaped portions 91, 93 on one side of the first ring-shaped slit 92 and a second narrow portion 96 bridging the second and third thin ring-shaped portions 93, 95 on another side of the second ring-shaped slit 94. The ring-shaped body 90 of non-magnetic material has a substantially S-shape in longitudinal half cross-section along the longitudinal axis X-X'.

Figure 7:
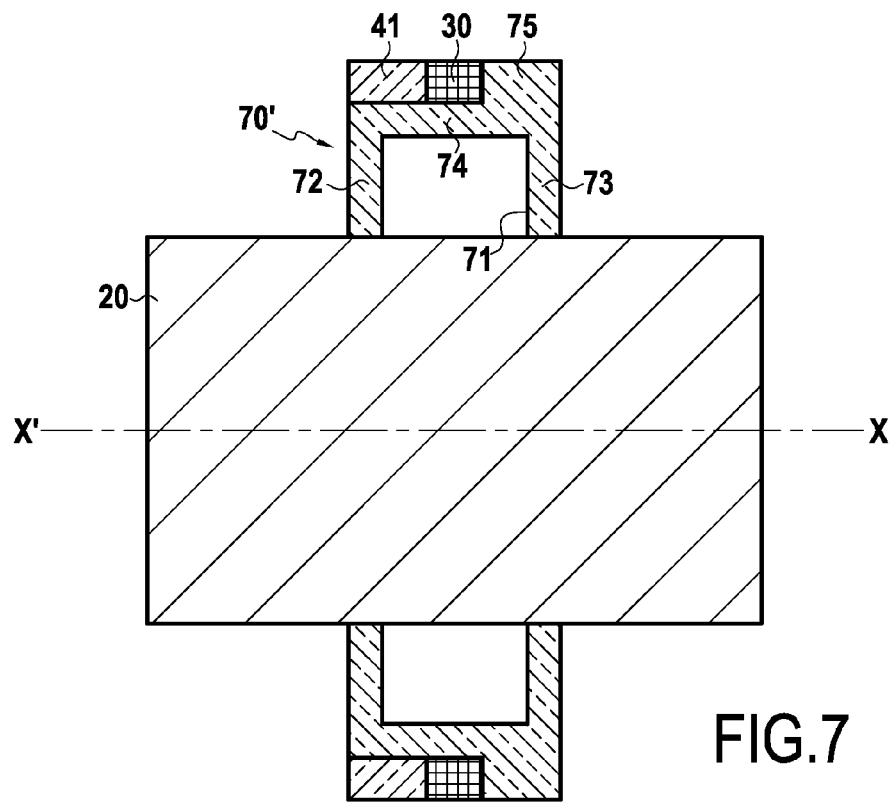
FIG. 7 is a longitudinal sectional view of components of a rotor sensor target according to a variant of the second embodiment of the invention.

FIG. 7 illustrates a variant embodiment of the sensor target of FIG. 2. The configuration is very similar, but in the embodiment of FIG. 7, the second ring 42 of the embodiment of FIG. 2 is replaced by a projection 75 of the relatively thin cylindrical portion 74 of a ring-shaped body 70' which was already present in the embodiment of FIG. 2.

Figure 8:
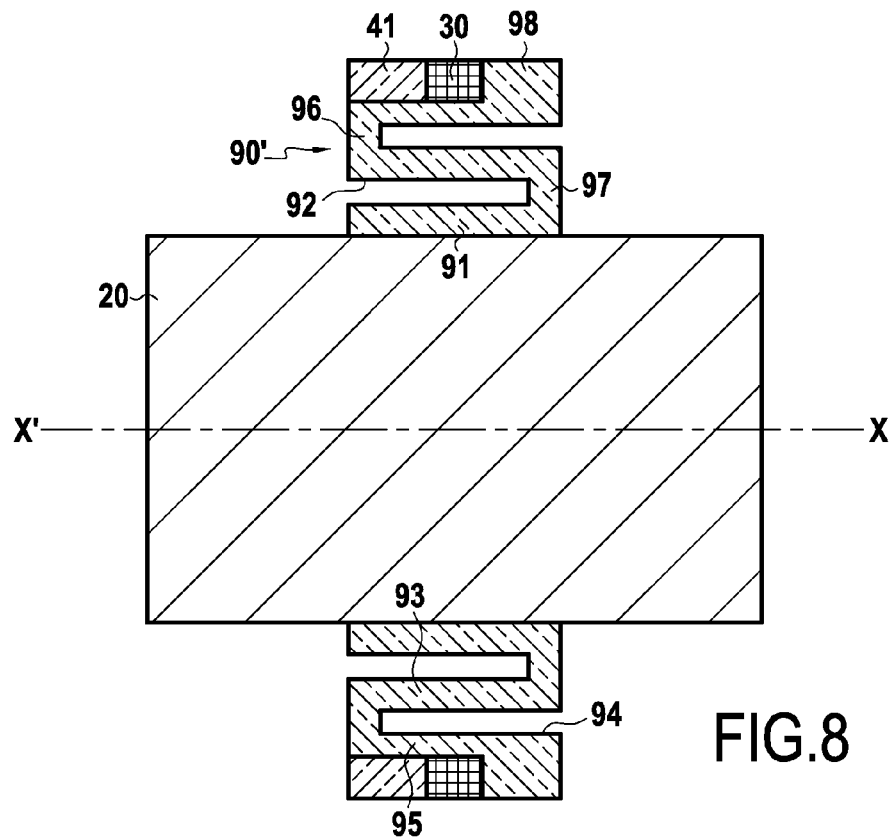
FIG. 8 is a longitudinal sectional view of components of a rotor sensor target according to a variant of the fourth embodiment of the invention.

FIG. 8 illustrates a variant embodiment of the sensor target of FIG. 6. The configuration is very similar, but in the embodiment of FIG. 8, the second ring 42 of the embodiment of FIG. 6 is replaced by a projection 98 of a thinner ring-shaped portion 94 of a ring-shaped body 90' which was already present in the embodiment of FIG. 6.

Generally speaking, the invention provides a simplification in the manufacturing process, increases performance and reduces cost.

Although preferred embodiments have been shown and described, it should be understood that any changes and modifications may be made therein without departing from the scope of the invention as defined in the appended claims. Thus the features of the different embodiments may be combined.

The invention claimed is:

1. A rotor sensor target for magnetic bearings, the rotor sensor target comprising:
a ring-shaped assembly of magnetic material centrally mounted on a radially outward surface of a material mount portion of a generally ring-shaped assembly of non-magnetic material, the generally ring-shaped assembly of non-magnetic material arranged to support the ring shaped assembly of magnetic material, the generally ring-shaped assembly of non-magnetic material and the ring shaped assembly of magnetic material are mounted on a shaft having a longitudinal axis of rotation X'-X, the generally ring-shaped assembly of non-magnetic material, the ring shaped assembly of magnetic material, and the shaft having a coaxial arrangement, the generally ring-shaped assembly of non-magnetic material extending radially outward from an exterior surface of the shaft to the ring-shaped assembly of magnetic material,
wherein the generally ring-shaped assembly of non-magnetic material comprises at least one ring-shaped slit having the longitudinal axis X'-X, each at least one ring-shaped slit formed at a location between the exterior surface of the shaft and the material mount portion of the generally ring-shaped assembly of non-magnetic material,
wherein each of the at least one ring-shaped slit is aligned along a radial direction with the ring-shaped assembly of magnetic material, the at least one ring-shaped slit having a design which reduces undue stresses when the ring-shaped assembly of magnetic material is subjected to a wide range of temperatures.

2. The rotor sensor target according to claim 1, wherein the generally ring-shaped assembly of non-magnetic material is made of aluminum.

3. The rotor sensor target according to claim 1, the generally ring-shaped assembly of non-magnetic material further comprising a set of a first independent ring and a second independent ring,
wherein the ring-shaped assembly of magnetic material is interposed within the set of the first independent ring and the second independent ring.

4. The rotor sensor target according to claim 1, wherein the generally ring-shaped assembly of non-magnetic material, comprises:
a first independent ring located on one side of the ring-shaped assembly of magnetic material, and
a second ring located on the other side of the ring-shaped assembly of magnetic material along the longitudinal axis X-X', the second ring being a projection of the material mount portion of the generally ring-shaped assembly of non-magnetic material extending internally beneath the first independent ring and the ring-shaped assembly of magnetic material along the longitudinal axis X-X'.

5. The rotor sensor target according to claim 1, wherein the at least one ring-shaped slit having the longitudinal axis X'-X is located between a thicker ring-shaped body of non-magnetic material mounted on the shaft and a thinner ring-shaped body of non-magnetic material mounted beneath the ring-shaped assembly of magnetic material.

6. The rotor sensor target according to claim 5, wherein the at least one ring-shaped slit having the longitudinal axis X'-X is closed at both ends by narrow projections of the thicker ring-shaped body of non-magnetic material mounted on the shaft.

7. The rotor sensor target according to claim 1, further comprising:
a first ring-shaped slit; and
a second ring-shaped slit,
each of the first ring-shaped slit and the second ring-shaped slit having the longitudinal axis X'-X which are provided within the generally ring-shaped body of non-magnetic material mounted on the shaft and located beneath the ring-shaped assembly of magnetic material;
the generally ring-shaped body of non-magnetic material further comprising:
a first thin ring-shaped portion mounted on the shaft,
a second thin ring-shaped portion located between the first and second ring-shaped slits,
a third thin ring-shaped portion located beneath the ring-shaped assembly of magnetic material,
a first narrow portion bridging the first and second thin ring-shaped portions on one side of the first ring-shaped slit,
a second narrow portion bridging the second and third thin ring-shaped portions on another side of the second ring-shaped slit, the generally ring-shaped body of non-magnetic material having a substantially S-shape in longitudinal half cross-section along the longitudinal axis X-X'.

8. The rotor sensor target according to claim 1, wherein the magnetic material is silicon iron.

9. The rotor sensor target according to claim 1, wherein the shaft is made of carbon steel.

10. The rotor sensor target according to claim 1, wherein the rotor sensor target is adapted for use as an axial-radial sensor for active magnetic bearings.

11. A rotor sensor target for magnetic bearings, the rotor sensor target comprising:
 a ring-shaped assembly of magnetic material centrally mounted on a radially outward surface of a thin ring-shaped body of a generally ring-shaped assembly of non-magnetic material, the ring-shaped assembly of magnetic material and the generally ring-shaped assembly of non-magnetic material are mounted on a shaft having a longitudinal axis of rotation X'-X, the generally ring-shaped assembly of non-magnetic material, the ring shaped assembly of magnetic material, and the shaft having a coaxial arrangement, the generally ring-shaped assembly of non-magnetic material extending radially outward from an exterior surface of the shaft to the ring-shaped assembly of magnetic material,
 wherein the generally ring-shaped assembly of non-magnetic material comprises at least one ring-shaped slit having the longitudinal axis X'-X, each at least one ring-shaped slit formed at a location between the exterior surface of the shaft and the ring-shaped assembly of magnetic material,
 wherein the at least one ring-shaped slit having the longitudinal axis X'-X is closed by at least one narrow projection of a thicker ring-shaped body of the generally ring-shaped assembly of non-magnetic material mounted on the shaft, the at least one narrow projection being located at a respective end of the associated at least one ring-shaped slit,
 wherein each of the at least one ring-shaped slit is aligned along a radial direction with the ring-shaped assembly of magnetic material, the at least one ring-shaped slit having a design which reduces undue stresses when the ring-shaped assembly of magnetic material is subjected to a wide range of temperatures.

12. The rotor sensor target according to claim 11, the generally ring-shaped assembly of non-magnetic material further comprising a set of a first independent ring and a second independent ring,
 wherein the ring-shaped assembly of magnetic material is interposed within the set of the first independent ring and the second independent ring.

13. The rotor sensor target according to claim 11, wherein the at least one ring-shaped slit having the longitudinal axis X'-X is located between a thicker ring-shaped body of non-magnetic material mounted on the shaft and a thinner ring-shaped body of non-magnetic material mounted beneath the ring-shaped assembly of magnetic material.

14. The rotor sensor target according to claim 11, wherein at least one of:
 (a) the magnetic material is silicon iron, and
 (b) the shaft is made of carbon steel.

15. A rotor sensor target for magnetic bearings, the rotor sensor target comprising:
 a ring-shaped assembly of magnetic material centrally mounted on a thin ring-shaped body of a generally ring-shaped assembly of non-magnetic material, which are coaxially arranged and mounted on a shaft having a longitudinal axis of rotation X'-X, the generally ring-shaped assembly of non-magnetic material extending radially outward from an exterior surface of the shaft to the ring-shaped assembly of magnetic material,
 wherein the generally ring-shaped assembly of non-magnetic material comprises at least one ring-shaped slit having the longitudinal axis X'-X, each at least one ring-shaped slit formed at a location between the exterior surface of the shaft and the ring-shaped assembly of magnetic material,
 wherein the at least one ring-shaped slit having the longitudinal axis X'-X is closed by the thin ring-shaped body of the generally ring-shaped assembly of non-magnetic material and a pair of narrow projections of a thicker ring-shaped body of the generally ring-shaped assembly of non-magnetic material mounted on the shaft, the pair of narrow projections being located at respective ends of the associated at least one ring-shaped slit,
 wherein each of the at least one ring-shaped slit is aligned along a radial direction with the ring-shaped assembly of magnetic material, the at least one ring-shaped slit having a design which reduces undue stresses when the ring-shaped assembly of magnetic material is subjected to a wide range of temperatures.

16. The rotor sensor target according to claim 15, the generally ring-shaped assembly of non-magnetic material further comprising a set of a first independent ring and a second independent ring,
 wherein the ring-shaped assembly of magnetic material is interposed within the set of the first independent ring and the second independent ring.

17. The rotor sensor target according to claim 15, wherein the at least one ring-shaped slit having the longitudinal axis X'-X is located between the thicker ring-shaped body of non-magnetic material mounted on the shaft and the thinner ring-shaped body of non-magnetic material mounted beneath the ring-shaped assembly of magnetic material.

18. The rotor sensor target according to claim 15, wherein at least one of:
 (a) the magnetic material is silicon iron, and
 (b) the shaft is made of carbon steel.

* * * * *